United States Patent [19]

Scattolin et al.

[11] 4,213,172
[45] Jul. 15, 1980

[54] MOVABLE STAND, PARTICULARLY FOR LAMPHOLDERS AND LAMP CARRIER THEREON

[76] Inventors: Antonio Scattolin, Via Sardegna, 45; Sergio Bernardi, Via B. Verro, 17/A, both of Milan, Italy

[21] Appl. No.: 878,549

[22] Filed: Feb. 16, 1978

[30] Foreign Application Priority Data

Jul. 29, 1977 [IT] Italy .............................. 21939/77[U]

[51] Int. Cl.² .......................... F21S 1/12; F29V 29/00; F21V 21/00; F21V 21/18
[52] U.S. Cl. .................................. 362/413; 362/373; 362/389; 362/402
[58] Field of Search ............... 362/373, 389, 401, 396, 362/402, 413

[56] References Cited

U.S. PATENT DOCUMENTS

| | | | |
|---|---|---|---|
| 2,090,439 | 8/1937 | Carwardine | 362/413 |
| 2,171,028 | 8/1939 | Gelb | 362/413 |
| 3,188,460 | 6/1965 | Thorsen | 362/401 |
| 3,535,508 | 10/1970 | Warshauser | 362/396 |
| 3,543,019 | 11/1970 | Jacobsen | 362/413 |
| 3,868,502 | 2/1975 | Beeren | 362/373 |
| 4,080,530 | 3/1978 | Krofsrud | 362/402 |

FOREIGN PATENT DOCUMENTS 191018 7/1957 Fed. Rep. of Germany .......... 362/413

Primary Examiner—Samuel W. Engle
Assistant Examiner—Donald P. Walsh
Attorney, Agent, or Firm—Guido Modiano; Albert Josif

[57] ABSTRACT

Movable stand for lampholders comprising an articulated parallelogram member associated with one end to a supporting base and carrying, at the other end, a lampholder. In order to balance the articulated parallelogram friction means are provided acting on a rod member of the articulated parallelogram. The friction means comprise a pair of shoes, arranged opposite each other and having a substantially mating shape to the shape of the rod member whereon the shoes are acting. The pair of shoes is supported by a pair of leaf springs pivoted at their other ends to an opposite rod member to the rod member whereon the shoes are acting.

6 Claims, 8 Drawing Figures

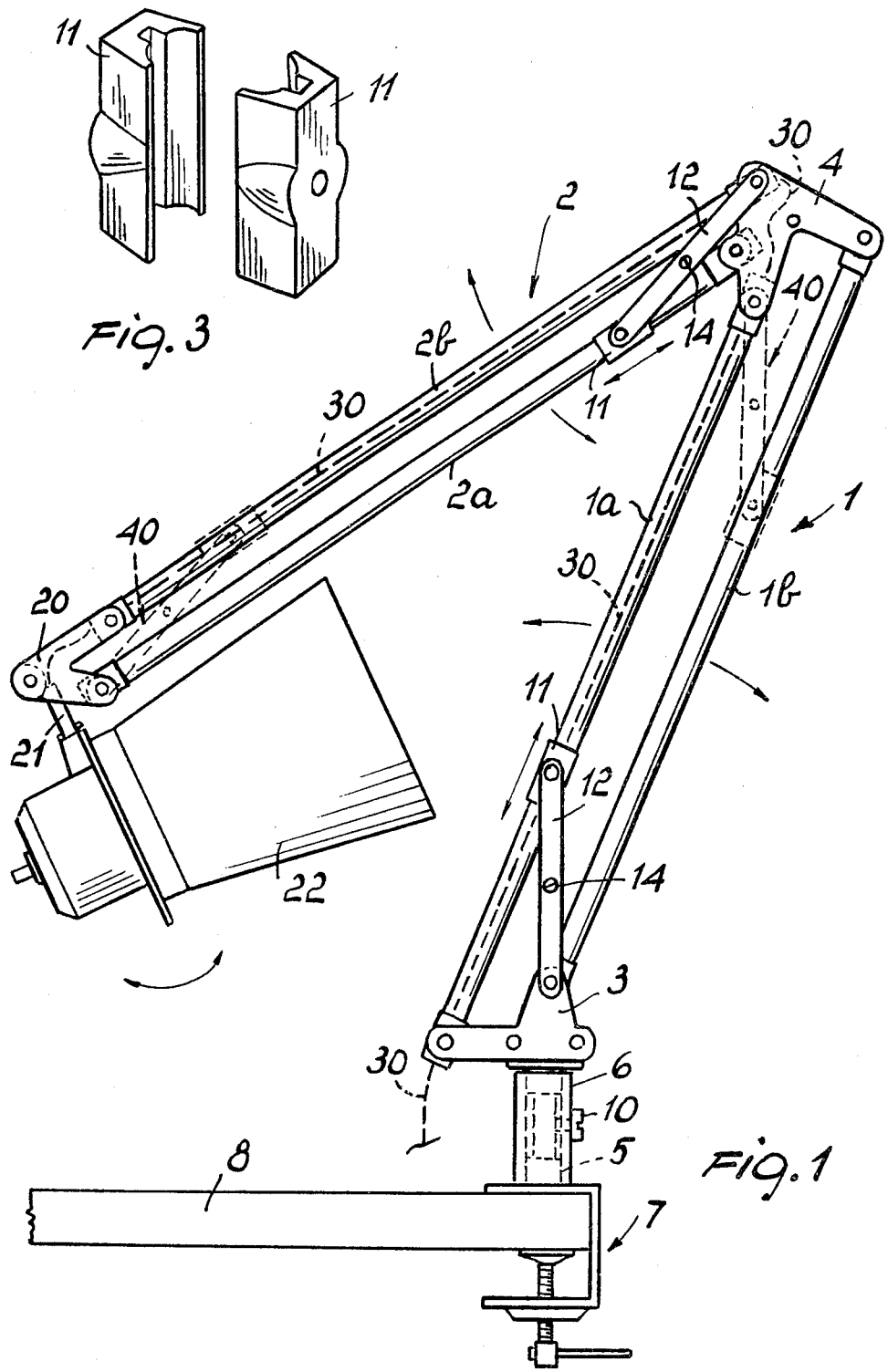

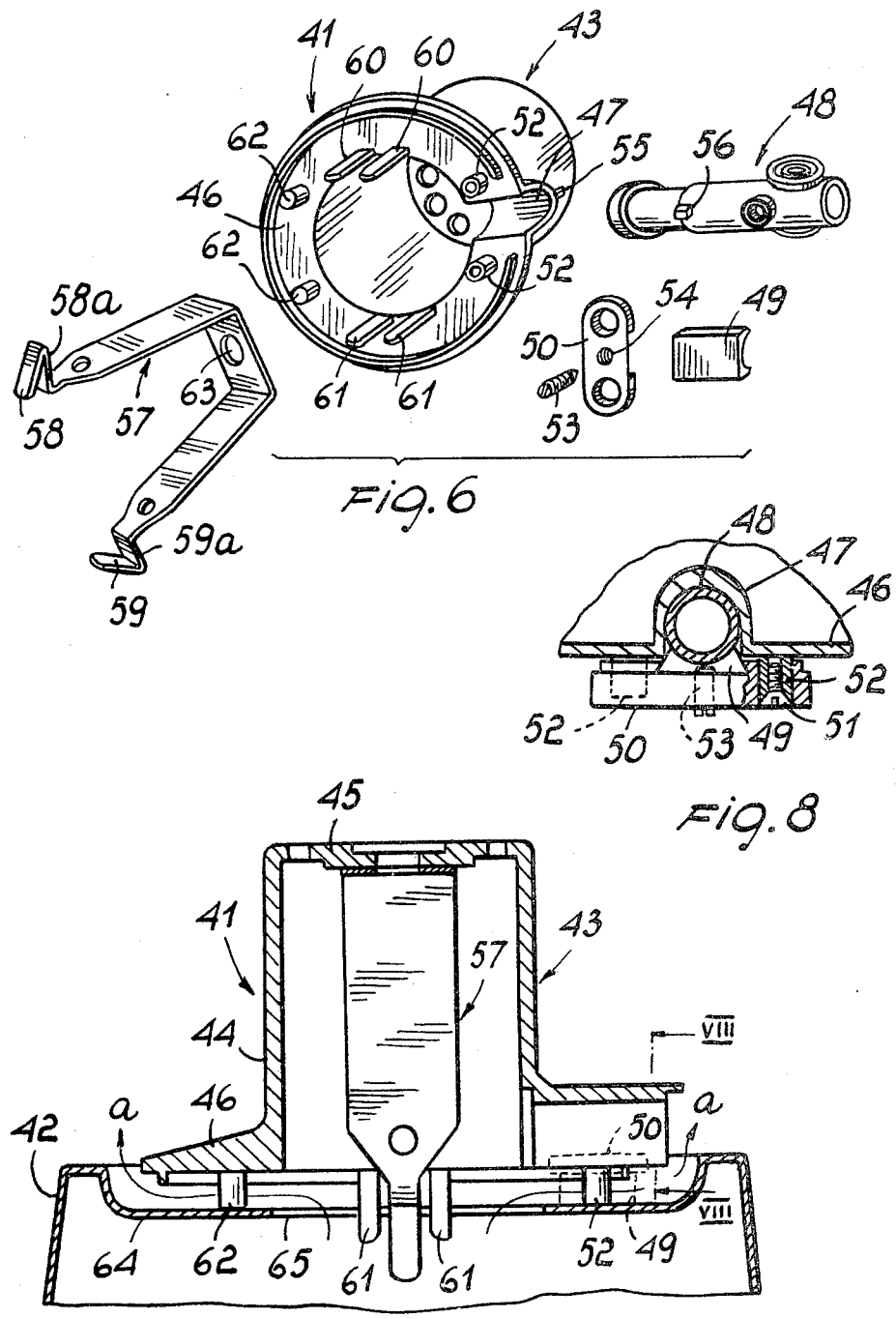

MOVABLE STAND, PARTICULARLY FOR LAMPHOLDERS AND LAMP CARRIER THEREON

BACKGROUND OF THE INVENTION

This invention relates to a movable stand, particularly for lampholders and a lamp carried thereon.

There are currently known stands for lampholders and the objects which comprise one or more arms of articulated parallelogram configuration which are balanced by one or more coil springs operating under tension or by torque springs.

This approach, while universally accepted, is not devoid of shortcomings: in fact, to provide the articulated parallelograms with the required stability and balance, it becomes necessary to arrange for a spring setting and balancing work which in most instances is remarkably complex.

Another drawback attributable to the known stands resides in that very seldom a balance of the arms constituted by the articulated parallelograms can be achieved which remains stable in any of the positions the stand is capable of assuming, thereby stand positions exist wherein the balance is uncertain.

A further drawback that may be attributed to the prior art movable stands, is that they are complicated construction wise, and accordingly expensive.

SUMMARY OF THE INVENTION

It is within the task of this invention to provide a movable stand which affords full and stable balance of the arms made up of articulated parallelograms, regardless of the position in which the stand is placed.

Furthermore, it is an object of the invention to drastically simiplify the means required to achieve that balance condition, while affording the advantage of a quick and easy setting of that same means, with the added capability of easily adjusting itself to the weight of the lampholder or of any other object to be supported by the instant movable stand.

A not unimportant object of this invention is to provide a movable stand which is easy to manufacture from elements commonly available on the market, simple and quick to assemble, and which has a highly competitive cost, such as to make it widely acceptable among the general public.

These and other objects, such as will be apparent hereinafter, are achieved by a movable stand particularly for lampholders and other objects, according to the invention, comprising at least one articulated parallelogram member associated with one end to a supporting base and carrying, at the other end, a lampholder or the like, characterized in that it further comprises, in order to balance said at least one articulated parallelogram, friction means acting on one rod member of said at least one articulated parallelogram.

Furthermore, according to the invention, a lamp is provided including a reflector-lampholding bowl or shade unit which affords very short assembling times and is constructed such as to ensure ventilation to an extent sufficient to provide, even after a prolonged period of continued operation, relatively low reflector temperatures.

With the invention reflector-bowl unit, full pivotability and self-postioning at 180° of said unit with respect to the supporting portion thereof is achieved in a simple manner.

According to the invention, the reflector-lampholding bowl is characterized in that it comprises a double ventilation circuit, an associating and self-positioning means spring-mounted between the lampholding bowl and reflector, and geometric engagement supporting means being provided which are positioning preloaded and pivotable through 180°.

BRIEF DESCRIPTION OF THE DRAWINGS

Further features and advantages of the stand or lamp according to the invention will become more clearly apparent from the following detailed description of a preferred, though not exclusive, embodiment of a movable stand or lamp, illustrated by way of example and not of limitation in the acompanying drawings, where:

FIG. 1 shows schematically the movable stand according to the invention;

FIG. 3 shows schematically the friction means;

FIG. 6 is an exploded view of the bowl or shade portion of the bowl-lampholding reflector unit;

FIG. 7 is a vertical section of the upper portion of the bowl-lampholding reflector unit, shown at a larger scale; and FIG. 8 shows a detail, partially in section, of those parts which allows the bowl-lampholding reflector unit to be rotated, along the line VIII—VIII of FIG. 7.

DESCRIPTION OF THE PREFERRED EMBODIMENTS

Figure 5:
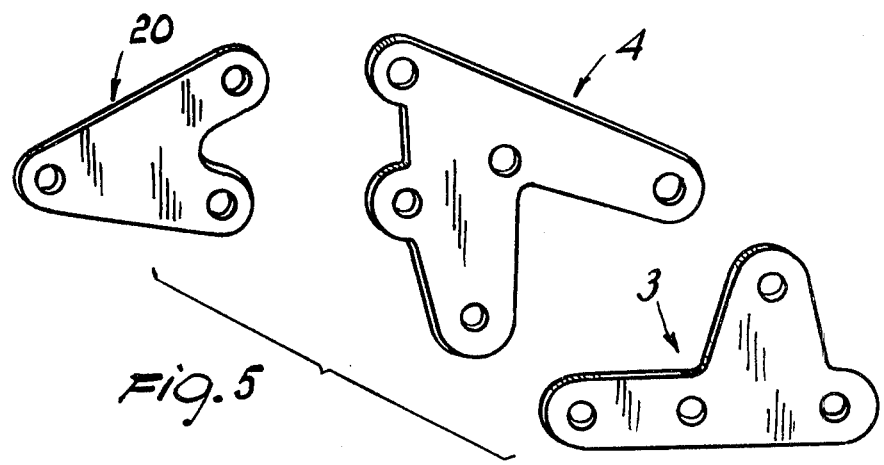
FIG. 5 shows schematically the connective members between the various articulated parallelograms, lampholder and supporting base.
Figure 4:
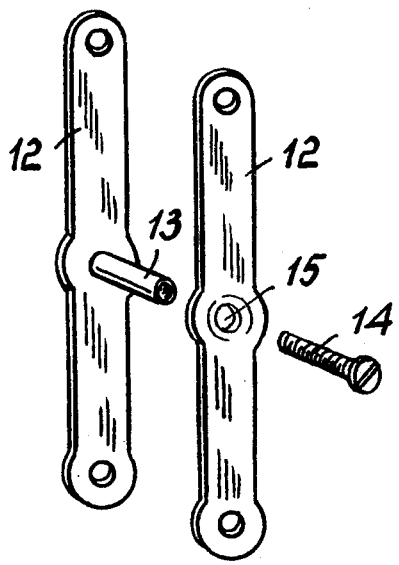
FIG. 4 shows the supporting and setting means for the cited friction means.
Figure 2:
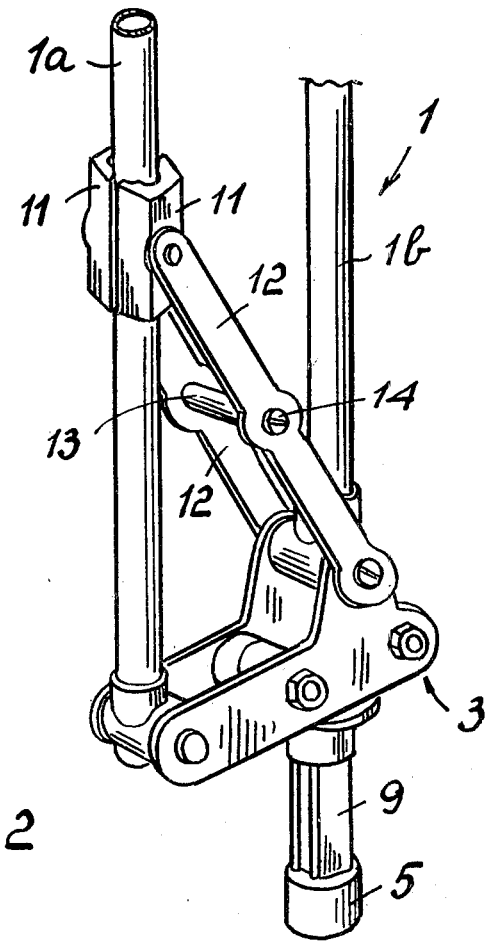
FIG. 2 is a perspective view of, in detail, the connection of the articulated parallelogram member to the supporting base.

With reference to the cited figures, the movable stand according to this invention may comprise one or more arms connected to one another and made up of articulated parallelograms, and in the embodiment shown in the drawings, the stand includes two arms respectively comprised of a first articulated parallelogram member, indicated at 1, and of a second articulated parallelogram member, indicated at 2; obviously, the number of arms may be any one, to suit individual requirements, without in any way affecting the stability of the instant inventive concept.

The first articulated parallelogram comprises two rigid rod members 1a and 1b having the same length and preferably made up of tubular elements which are provided at their ends with fixed and parallel pins which articulate with the connective member to the base 3 and with the intermediate connective member 4.

From the connective member to the base 3 there extends a pin 5 which is accommodated in a sleeve member 6 constituting part of the supporting base, which in the embodiment shown comprises a clamp screw 7 for connection to a supporting surface 8. Preferably, the pin 5 is pivotable about its own axis in the sleeve 6, such as to allow the movable stand to be rotated about an axis perpendicular to the supporting surface 8. In order to adjust the amount of force required to effect such a rotation, at a middle position of the pin 5 there is provided a U-like shaped elastic reed 9 associated with the pin 5; moreover, at the central portion of the cited U-like spring 9 a screw 10 is operative which is supported by the sleeve 6 and practically controls the amount of frictional force of the reed spring 9 relative to the sleeve 6 and, accordingly, the force required to provide rotation of the movable stand about the cited axis extending perpendicular to the supporting surface 8.

To effect the balancing of the first articulated parallelogram member 1, friction means are provided which act on one of the rods 1a or 1b composing the parallelogram member 1.

In the example illustrated, said friction means comprise a pair of shoes 11, located opposite each other, which surround the rod 1a mating its sectional shape and are supported by supporting and setting or calibrating means including a pair of elastic leaf springs 12, which at their other ends are pivoted to the articulation pivot pin of the rod 1b.

Furthermore, it should be noted that at the ends of the leaf springs 12 remote from the ends of articulation to the rod 1b, the leaf springs 12 are pivoted to the shoes 11 through a pin located at the center of the cited shoes 11.

The leaf springs 12 are interconnected by a tie member comprising an internally threaded bushing 13 which is rigidly mounted to one of the leaf springs 12, and a set screw 14 passed through a hole 15 formed at the center of the other leaf spring 12 and pivotally engaging the cited internally threaded bushing 13.

Consequently to the aforementioned couplings, the ends of the leaf springs 12 are free to rotate both about the center pivot of the shoes 11, and about the connecting pin of the rod 1b.

It should be observed, at this point, that for constructional convenience the leaf springs 12 are connected to the articulation pivot pin of one of the rods making up the parallelogram member, although obviously nothing would change should the ends of the leaf springs be directly attached, for example, to a middle portion of one rod, while the shoes 11 act in friction engagement with the other rod.

As mentioned, at its upper end, the first parallelogram member 1 articulates to an intermediate connective member 4, whereto a second parallelogram member, indicated at 2, also articulates which is of similar design to the parallelogram just described and comprises a pair of rod members 2a and 2b. The second parallelogram will not be described herein in any detail as it is identical to the parallelogram 1, and the same is true for the friction means which also includes a pair of shoes 11 supported by a pair of leaf springs 12 which are pivoted about the fulcrum of the rod 2b; in the drawing illustrating the friction means, the same reference numerals are used to denote both parallelogram members.

At the end of the second parallelogram 2, remotely located from that connected to the intermediate connective member 4, there is provided a connection member for the lampholder, indicated at 20, which is articulated to the rods 2a and 2b and supports, through a knuckle joint 21, a lampholder 22 which may have any shape and configuration. For greater convenience in use, the knuckle joint 21 allows the lampholder to be rotated about a pivot pin having its axis parallel to the fulcra of the second parallelogram member 2 as well as about an axis laying along a parallel direction to the direction of the fulcra for the rods 2a and 2b of the second parallelogram 2.

To complete the description, it should be added that the lampholder connecting electric cable 30 is preferably led inside the rods which, as mentioned above, are made up of tubular elements.

The balancing of the various arms of the movable stand, consisting as mentioned of articulated parallelogram members, is carried out in the following manner: as the free end of the stand is loaded with the object to be supported, which in the instant case is the lampholder 22, the parallelogram(s) is caused to deform as the free end moves downwards, owing to the attendant approaching movement of the longitudinal axes of the rods which make up the parallelogram(s).

It thus happens that the shoes 11 are caused to slide along the axis of the rods, respectively 1a and 2a.

To set the assembly into an equilibrium state, it is only required that the setting means of the pairs of shoes 11 are operated to clamp the leaf springs 12 therebetween by acting on the set screw 14, until the two shoes are caused to closely adhere, respectively to the rod 1a and rod 2a, wherealong they are compelled to slide.

Thus, a sufficient amount of friction resistance is created to block the movement of the parallelogram.

In order to avoid an excessive clamping force in the leaf springs 12, should the load applied on the stand be such as to prevent a system balance from being achieved, it is possible to add, to each articulated parallelogram member, another pair of shoes, as shown in dotted lines in FIG. 1 and indicated at 40.

Of preference, the pair of shoes 40 are attached to the other end of the parallelogram. This for construction simplicity reasons, as the inventive concept would not be affected by the addition of shoes at another location.

When it is desired to change the attitude of the movable stand in order to vary the position of the lamp holder or other object carried thereby, it will suffice to apply a small force acting in the direction of the newly selected attitude until the desired final configuration is reached.

Upon removing said force, the stand will remain still and stable in the new position without requiring any increase in the shoe friction force as already set by operating the set screw 14.

This allow the movable stand to be positioned, said stand comprising as mentioned above either one or more arms in the form of articulated parallelograms, in any position and with any inclination, actually from a horizontal position through 180° to the opposite horizontal position.

From the above description, it will be apparent that the invention fully achieves its objects, and in particular the fact should be stressed that by adopting friction means for balancing articulated parallelogram members, a stable positioning of the movable stand in any position becomes feasible toward any desired final configuration thereof, without encountering any of the setting problems from which prior art stands suffer.

Making now reference to FIGS. 6-8, the numeral 41 denotes the unit formed by the reflector 42 and lampholding bowl or shade 43. The latter comprises a molded body of a plastic material, said body having a cylindrical liner 44 with a bottom 45 and an annular flange 46 at the opposite side to the bottom 45, said flange being interrupted or discontinued by a notch 47. The latter, together with a tubular sector 48 forms the 180° pivotable geometric engagement supporting means. The same is completed by an intermediate insert 49 and small attaching plate 50. The association of such parts is clearly visible in FIG. 8. During the assembling, the front recessed portion of the tubular sector 48 is first inserted into the seat 47, thereafter the insert 49 is attached, followed by the bridge 50, the same being secured to the bowl 43 by means of two screws 51 (one whereof is visible in FIG. 8), which engage holes in the lugs 52 also acting as spacers, as explained more clearly hereinafter. With the screw 53 engaging the threaded hole 54 of the bridge 50, the pressure of the insert 49 onto the tubular sector 48 may be adjusted.

At 55 and 56, there are indicated two lugs, respectively on the bowl 43 and tubular sector 48, which serve to confine the freedom of rotation through 180° between said two parts.

At 57 is indicated a spring-mounted bracket having a substantially U-like section, the ends 58 and 59 whereof are folded back hook-fashion and present their active side at 58a, 59a. In the bowl 43, there are indicated at 60 and 61 positioning lugs for said bracket 57, and at 62, positioning lugs acting as spacers similar to the lugs 52.

Upon assembling the bracket 57, the same is inserted with its hole 63 into the connection of the lampholder and is clamped between it and the inner side of the bottom 45 of the bowl.

As may be seen in FIG. 7, the upper side of the reflector 42 has a recess 64 occupying most of its surface and provided with a middle opening 65. From that same Figure, it may be seen that in order to assemble the reflector-lampholding bowl unit, it is sufficient that the hook-like ends 58 and 59 of the bracket 57 be moved closer to each other, thereafter the recess 64 of the reflector is brought to rest on the lugs 52 and 62, and finally that the ends 58 and 59 of the bracket be released to return to a position of their active sides 58a and 59a engaging the inner side of the recess 64 with consequent blocking of the reflector positioning. Disassembly takes place in the reverse order.

It should be implicitly understood that the knuckle joined rod-like arm structure illustrated in the drawings may be easily replaced in actual practice by any other desired articulated, or swivelling, structure, without departing from the scope of this invention.

The dimensions and materials may be any ones, also without departing thereby from the invention scope.

In practicing the invention, it will be definitely possible to replace the individual parts shown with other functionally equivalent ones, as well as to modify the geometric configuration thereof, again without in so doing departing from the invention scope.

All of the characteristics which may be deducted from the foregoing description, and from the claims and drawings, are to be considered as substantial to the invention, either singly or as a combination thereof.

We claim:

1. A movable stand particularly for lampholders and other objects, comprising a supporting base defining a main axis of the stand, at least one articulated parallelogram member of elongated extension, including a first and a second articulated elongated rod members parallel and laterally spaced with respect to each other and a first and a second articulated link members pivotally connecting said first and said second elongated rod members at opposite ends thereof to form said articulated parallelogram, said articulated parallelogram member being associated with one said link members thereof selectively to said supporting base and to a lampholder or the like and to another articulated parallelogram, friction means acting at least on said first longitudinal rod member in order to balance said articulated parallelogram member, wherein according to the improvement said friction means comprise at least one pair of shoes arranged to clamp therebetween in a frictional manner said first rod member, a pair of coextensive, laterally spaced apart resilient, leaf-spring like bars, each having one end thereof connected with one said shoes pivotally about a first axis perpendicular to the longitudinal extension of said first rod and another end thereof pivotally connected to a point of said articulated parallelogram remote from said first rod member, the pivotal connection being about a second axis parallel to said first axis, an adjustable tie member extending transverse to said leaf-spring like bars and connecting one intermediate point of one said leaf-spring like bars with another intermediate point of another said leaf-spring like bars, said tie member having screw means for adjusting the mutual distance between said leaf-spring like bars thereby to regulate the resilient pressing and friction action thereof on said shoes and thereby against said first rod member frictionally clamped between said shoes.

2. A movable stand according to claim 1, wherein said friction means comprise a second pair of shoes arranged to clamp therebetween in a frictional manner said second rod member and a second pair of said leaf-spring like bars having said another end thereof pivotally connected to a point of said articulated parallelogram remote from said second rod member.

3. A movable stand according to claim 1, wherein said supporting base includes a pin extending from said one link member and coaxial with said main axis, a clamp screw member including a sleeve projecting therefrom and coaxial with said main axis, said pin being inserted into said sleeve and in pivotal relationship therewith, an U-like shaped reed spring in engagement with said pin within said sleeve, means in said sleeve arranged to act against said reed spring to adjust the friction engagement thereof with said pin.

4. A movable stand according to claim 1, in combination with a lampholding bowl-reflector unit, characterized in that the unit comprises a double ventilation circuit, an associating and self-positioning means springmounted between the lampholding bowl and reflector, and a geometric engagement supporting means being provided which is positioning preloaded and pivotable through 180°.

5. A unit according to claim 4, characterized in that the double ventilation circuit comprises a ventilation passage provided between the reflector and lampholding bowl at the reflector upper portion.

6. A unit according to claim 4, wherein the geometric engagement supporting means with positioning preload between the lampholding bowl and head articulation of the supporting rod-like arms comprises a semi-circular seat provided in the bowl and a tubular element engaging in said notch with a recess thereof, and a bridge element with an insert interposed between the same and said tubular element, a screw engaging in a threaded hole of the bridge element allowing the resting pressure of the insert element on the tubular element to be adjusted.

* * * * *